Sept. 10, 1963 J. H. ENGELMAN Re. 25,440

MAGNETRON TUBE

Original Filed Dec. 16, 1959

INVENTOR.
JOSEPH H. ENGELMAN

BY

Fidler, Beardsley, Bradley, Patnaude & Petherbridge
Attys.

United States Patent Office

Re. 25,440
Reissued Sept. 10, 1963

25,440
MAGNETRON TUBE

Joseph H. Engelman, Paoli, Pa., assignor to Burroughs Corporation, Detroit, Mich., a corporation of Michigan Original No. 3,031,595, dated Apr. 24, 1962, Ser. No. 859,979, Dec. 16, 1959. Application for reissue Nov. 21, 1962, Ser. No. 239,876
16 Claims. (Cl. 313—157)

Matter enclosed in heavy brackets [ ] appears in the original patent but forms no part of this reissue specification; matter printed in italics indicates the additions made by reissue.

This invention relates to magnetron-type electron discharge tubes and to improvements in the construction of such tubes, particularly in the portion thereof which produces the magnetic field.

One form of magnetron tube, to which the principles of the invention apply, includes an electrode assembly which comprises an elongated central cathode and a plurality of groups of elongated electrodes surrounding the cathode and secured together at their opposite ends by means of insulating end disks or plates. All of the electrodes are substantially parallel to each other. An external cylindrical magnet surrounds the tube envelope and electrode assembly.

In operation of this type of tube, a beam of current flows from the central cathode and is urged to rotate around the tube under the influence of crossed electric and magnetic fields. The beam may remain at one group of electrodes indefinitely, or it may be switched from position to position by the application of proper potentials to selected ones of the tube electrodes.

It has been found that some of the electrons in the beam from the cathode tend to flow toward the ends of the electrode assembly where they strike the insulating end disks which support the electrodes. This electron bombardment of the insulating disks causes them to become electrically charged, with the result that the electric field in the tube becomes distorted and electron flow is adversely affected.

Another problem inherent in tubes of the type described above results from the use of the cylindrical magnet. The operation of mounting and securing the magnet is comparatively critical since optimum tube operation depends on a particular and exact orientation of the magnet. By comparison with other tube operations, the steps of positioning and securing the magnet are undesirably time consuming.

In addition, when the tubes are in use, extraordinary care must be exercised to avoid striking the tube and thereby disorienting the magnet. Such disorientation, even though slight, might render the tube useless.

The objects of the present invention are concerned with the provision of an improved construction for a magnetron beam switching tube in which the placement of the means for generating the magnetic field is not critical and, in addition, an improved magnetic field configuration is achieved which provides improved electron beam flow.

In brief, a magnetron-type electron tube embodying the invention comprises, in a suitable envelope, an electrode assembly including a central longitudinally elongated cathode electrode surrounded by groups of longitudinally elongated electrodes which are adapted to form and receive an electron beam from the cathode. The various electrodes are secured together parallel to each other by means of insulating end disks secured to the opposite ends of the electrodes. In place of the conventional cylindrical permanent magnet surrounding the tube, an assembly of permanent magnet rods spaced apart uniformly and parallel to each other is provided. The magnet rod assembly is coaxial with the electrode assembly and may be either outside or inside the tube envelope.

The invention is described in greater detail by reference to the drawing, wherein.

Figure 1:
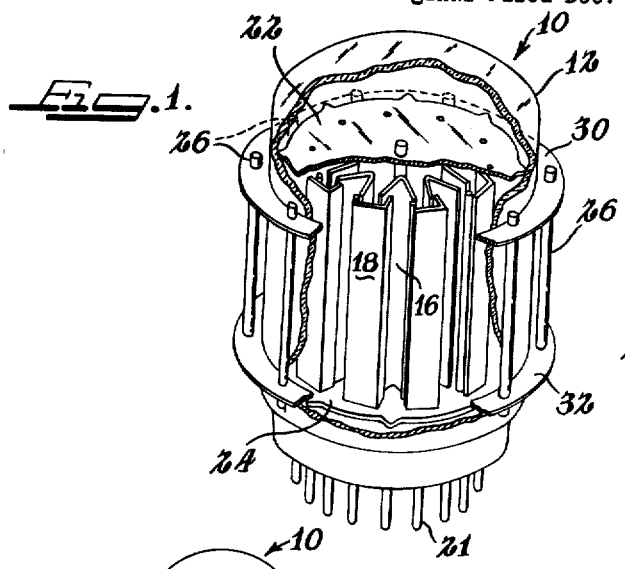
FIG. 1 is a perspective view, partly in section, of a magnetron beam switching tube embodying the invention.

The principles of the invention are applicable to magnetron tubes and, particularly, to a multi-position Type 6700 magnetron beam switching tube. This type of tube is cylindrical in form and includes an envelope 12 which contains a central longitudinally elongated cathode 14 and ten groups of electrodes spaced radially equidistantly from the cathode and surrounding the cathode. Each group of electrodes includes a generally U-shaped elongated spade electrode 16 and a generally L-shaped target electrode 18 positioned so that each target occupies the space between adjacent spade electrodes. Each spade electrode serves to form and hold an electron beam on its corresponding target electrode. A generally rod-like switching electrode 20 is also included in each group of electrodes and is positioned between one edge of each target electrode and the adjacent spade electrode. The switching electrodes are known as switching grids. *This electrode structure is described in Fan et al. Patent No. 2,721,955 which is assigned to the assignee of the present application.* All of the tube electrodes are secured together by means of top and bottom mica disks 22 and 24. The tube 10 also includes magnet means, to be described, which provides an axial magnetic field which is utilized in conjunction with electric fields within the tube to form and switch an electron beam from the cathode to each of the groups of electrodes. The direction in which the beam switches, that is clockwise or counter-clockwise, is always the same and is determined by the orientation of the electric and magnetic fields.

Figure 3:
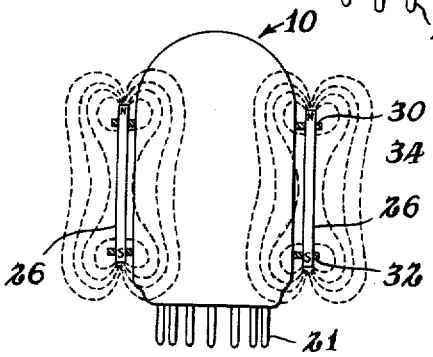
FIG. 3 is an elevational view of the tube of FIG. 1 illustrating the general orientation of the magnetic field of the tube.
Figure 4:
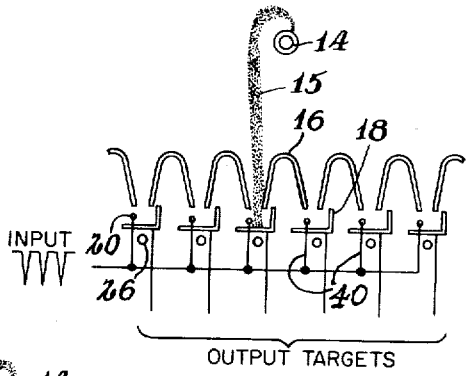
*FIGS. 4 and 5 are schematic views of the electrodes of the tubes of FIGS. 1 to 3 showing illustrative electrical connections thereto.*

Briefly, in operation of tube 10, electrons emitted by the cathode are retained at the cathode if each of the spades, targets and switching grids carries its normal operating electrical potential. When a spade or switching grid experiences a suitable lowering of its potential, an electron beam is formed and directed to the corresponding target electrode. The electron beam may be switched from one target electrode to the next by thus suitably altering the electrical potentials of a spade or switching grid. *The above-identified Fan et al. patent discloses an illustrative tube in which the electrical potential of one or more switching grids is altered in order to achieve switching of the beam. Indeed, to facilitate the explanation of tube 10, two figures of the Fan et al. patent, slightly modified to include L-shaped targets 18 and rod magnets 26, have been incorporated into the drawing of the present application as FIGS. 4 and 5. These figures show in schematic diagram form the electrodes of the tubes of FIGS. 1 to 3, namely the cathode electrode 14 which emits an electron beam 15, the U-shaped spade electrodes 16, the L-shaped target electrodes 18 and the switching grids 20. FIG. 4 also shows a set of electrical leads 40 connected to each of the switching grids. To achieve switching, leads 40 are energized by an input signal having a duration selected to obtain stepping of the electrode beam from one target to the next, or further if*

Figure 5:
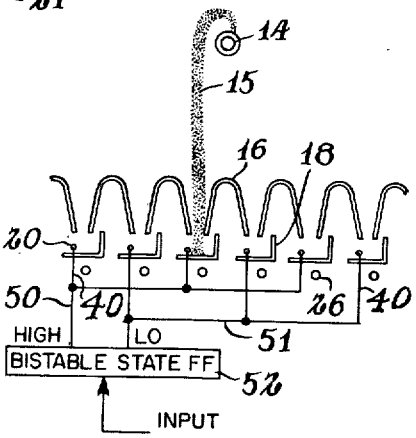

*desired. Similarly, FIG. 5 shows two sets of electrode leads 50 and 51, these sets being connected to alternate switching grids. To achieve switching in this circuit, an input signal is applied to a bistable state flip-flop 52 to lower the potential on one of the leads 50 or 51 while raising the potential of the other one of these leads. The reduced potential applied to the switching grid forwardly of the position of the electron beam will cause the beam to step from one target to the next. The duration of the applied signal in this case is of no consequence, since even though the duration of the input signal may be unduly long, the beam will only step one position in view of the fact that the next succeeding switching grid in the forwardly direction is at a raised potential. In practice, the leads connected to the various switching grids, as well as those connected to the cathode, spade and target electrodes, are connected to the tube pins 21 shown in FIGS. 1 and 3.*

Under normal operating conditions, whenever electrode voltages are such that a beam might be supported at several positions, the beam switches to the most leading position and locks in at this position.

According to the present invention, magnet means for obtaining the desired magnetic field in the tube 10 comprises an array of permanent magnet rods 26 provided surrounding and coaxial with the electrode assembly. The corresponding magnetic poles of the rods are oriented adjacent to each other. In FIG. 1, the magnet rods are placed outside the tube envelope and held in position in any suitable fashion, for example, by means of insulating rings 30 and 32 which are cemented or otherwise held in place surrounding the tube envelope. Substantially any number of magnet rods 26 may be employed, with, for example, one rod for each group of electrodes being satisfactory.

Figure 2:
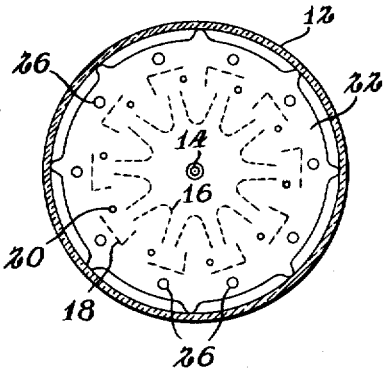
FIG. 2 is a sectional view of a modification of the tube of FIG. 1.

In a modification of the invention shown in FIG. 2, the desired magnetic field is provided and, in addition, a more compact tube construction is achieved by mounting the magnet rods 26 inside the tube envelope 12 and surrounding the electrode assembly. The magnet rods may be supported in any suitable fashion, for example, by having their ends inserted in suitable apertures in the top and bottom mica disks 22 and 24. An important advantage of this embodiment of the invention is that it reduces the size of the tube.

One advantage of the present invention resides in the fact the positioning of the magnet rods is considerably less critical than the positioning of a cylindrical magnet surrounding the tube. In addition, the magnet rods seem to provide a magnetic field pattern of the form generally indicated by the flux lines 34 in FIG. 3. The magnetic flux lines 34 bend [toward the center of the electrode cage] *along the central region of the magnet rods 26.* This configuration of magnetic flux lines, in conjunction with the electric fields in the tube, tends to limit an electron beam to the center of the cage and prevents fanning out of a beam to strike the top and bottom mica disks.

What is claimed is:

[1. A magnetron tube including an envelope, an electrode assembly in said envelope, said electrode assembly having a longitudinal axis in said envelope and including a central cathode and a plurality of electrodes surrounding said cathode and adapted to receive electron beams from said cathode, and magnet means providing an axial magnetic field in said envelope for controlling the flow of electrons from said cathode to said electrodes said magnet means comprising a plurality of spaced-apart rod-like magnets oriented substantially parallel to each other and parallel to and surrounding said electrode assembly.]

*2. A magnetron beam switching tube having crossed electric and magnetic fields for directing the flow of electrons along a selected one of a plurality of different paths including an envelope, an electrode assembly in said envelope having a longitudinal axis and including a central cathode disposed along said longitudinal axis and a plurality of groups of electrodes surrounding said cathode, each of said groups including at least a target electrode for receiving an electron beam from said cathode and producing an output signal therefrom and a spade electrode for holding the electron beam on its associated target electrode, and magnet means providing an axial magnetic field within said envelope in the region about said cathode for controlling the flow of electrons from said cathode to said electrodes, said magnet means comprising a plurality of spaced apart rod-like magnets oriented substantially parallel to each other and parallel to and surrounding said electrode assembly.*

*3*[2]. The tube defined in claim *2*[1] wherein said magnet rods are external to and surround the tube envelope.

*4*[3]. The tube defined in claim *2*[1] wherein said magnet rods are mounted inside said envelope and surrounding said electrode assembly.

*5*[4]. A magnetron beam switching tube having an electrode assembly including a cathode and a plurality of groups of electrodes; each group of electrodes including a target electrode which receives an electron beam and produces an output signal therefrom, a spade electrode which holds an electron beam on its associated target electrode, and a switching electrode which serves to switch an electron beam from one group of electrodes to the next; and an array of magnet rods surrounding said electrode assembly.

*6. A magnetron beam switching tube having crossed electric and magnetic fields for directing the flow of electrons along a selected one of a plurality of different predetermined paths including an envelope, a cathode within said envelope, a plurality of groups of electrodes surrounding said cathode for establishing an electric field in the region between the cathode and said surrounding electrodes, each of said groups of electrodes including at least a target electrode for receiving an electron beam from said cathode and producing an output signal in response thereto and a spade electrode for holding the electron beam on its associated target electrode, and magnet means providing a magnetic field within said envelope in the region surrounding said cathode and in a direction transverse to the electric field for directing the flow of electrons from the cathode to the surrounding electrodes, said magnet means including a plurality of spaced-apart rod-like magnets surrounding the cathode and oriented substantially perpendicular to said electric field.*

*7. A magnetron-type beam switching tube as defined in claim 6 wherein the magnet means comprises an array of rod-like magnets spaced symmetrically about the cathode and located within the envelope.*

*8. A magnetron-type beam switching tube as defined in claim 6 wherein the lengths of said rod-like magnets are such that the magnetic field produced by each such rod deviates substantially from a parallel field along the central region of the rod.*

*9. A magnetron-type beam switching tube which utilizes crossed electric and magnetic fields including an envelope, a cathode within said envelope for generating an electron beam, a plurality of electrodes disposed in a symmetrical array surrounding said cathode, means connected to selected ones of said electrodes for applying thereto a potential to establish an electric field between said cathode and said electrodes, a plurality of rod-like magnets positioned within said envelope for establishing a magnetic field transverse to the electric field and in the region of said electric field, and means connected to selected ones of said electrodes for applying a potential signal to one or more such electrodes to initiate a disturbance in the relationship between said electric and said magnetic fields for causing the electron beam to step from one electrode of said array to another.*

*10. A magnetron-type beam switching tube having crossed electric and magnetic fields for directing the flow of electrons along a selected one of a plurality of dif-*

*ferent predetermined paths, depending upon the relative magnitudes and configurations of such fields, including an envelope, an elongated cathode within the envelope for generating an electron beam, and a plurality of arrays of elongated members each spaced symmetrically about said cathode within said envelope, said arrays including at least an array of target electrodes for receiving the electron beam from said cathode and producing an output signal in response thereto and an array of spade electrodes each for holding the electron beam on its associated target electrode, and circuit means connected to at least one of said arrays for applying a potential thereto to establish a radial electric field between said cathode and said surrounding arrays, the members of at least one of said arrays being rod magnets for establishing a magnetic field transverse to said electric field and in the region of said electric field.*

*11. The tube of claim 10 wherein the members of at least one of said arrays are switching electrodes for receiving a switching signal to alter the configuration of the electric field and thereby cause said beam to step from one target electrode to the next.*

*12. A magnetron-type beam switching tube which utilizes crossed electric and magnetic fields including an envelope, an electrode assembly including a cathode and a plurality of groups of electrodes surrounding said cathode within said envelope for establishing an electric field in the region between the cathode and surrounding electrodes, each group of electrodes including a target electrode for receiving an electron beam from said cathode and producing an output signal in response thereto, a spade electrode for holding the electron beam on its associated target electrode, and a switching electrode for switching the electron beam from one group of electrodes to the next; and a permanent magnet structure within said envelope and surrounding said cathode for producing a magnetic field in the region of, but transverse to, said electric field.*

*13. A magnetron-type beam switching tube as defined in claim 12 wherein the permanent magnet structure comprises an array of rod magnets spaced symmetrically about the cathode and oriented parallel to one another.*

*14. The tube of claim 13, wherein one of said rod magnets is located adjacent each of said electrode groups.*

*15. A multi-position magnetron-type beam switching tube which utilizes crossed magnetic and electric fields including an evacuated envelope containing an elongated cathode electrode, and an array of electrodes spaced from said cathode electrode for establishing an electrical field in the region between the cathode electrodes and the electrode array, such array of electrodes including a plurality of target electrodes spaced apart from one another along the predetermined path for receiving an electron beam from the cathode, a plurality of switching electrodes one adjacent each target electrode for switching the beam from one target to another, and a plurality of U-shaped spade electrodes located intermediate the target electrodes and the cathode, one such spade electrode being positioned adjacent each target electrode with its closed end facing the cathode for holding the electron beam on its associated target, adjacent spade electrodes being spaced apart with the passageway between adjacent spades aligned with a target electrode, electrically conductive leads connected to each said electrode and passing through said envelope for connection to external electric circuits, and a plurality of permanent magnets positioned within said envelope in the region of said array of electrodes for producing a magnet field in the region of but transverse to said electric field.*

*16. A magnetron-type beam switching tube as defined in claim 15 wherein the cathode electrode is a centrally located rod-like electrode and the electrode array is located symmetrically about said cathode electrode.*

*17. A magnetron-type beam switching tube as in claim 16 wherein the permanent magnets are spaced symmetrically about the cathode and oriented parallel to one another.*

References Cited in the file of this patent or the original patent

UNITED STATES PATENTS

| | | |
|---|---|---|
| 1,321,432 | Hewitt | Nov. 11, 1919 |
| 2,244,318 | Skellett | June 3, 1941 |
| 2,640,173 | Cavanagh | May 26, 1953 |
| 2,857,552 | Hoberg | Oct. 21, 1958 |